United States Patent
Kim

(10) Patent No.: US 8,562,058 B1
(45) Date of Patent: Oct. 22, 2013

(54) LIGHT MODULE FOR UPPER AND LOWER GLOVE BOX BIN

(75) Inventor: Yoon Kim, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/614,254

(22) Filed: Sep. 13, 2012

(51) Int. Cl.
  *B60R 7/06* (2006.01)
(52) U.S. Cl.
  USPC .................. 296/37.12; 362/489; 362/548
(58) Field of Classification Search
  USPC ............... 296/37.12; 362/137, 133, 488, 489, 362/546, 548; 312/223.5; 248/250; 108/23, 108/44, 45
  See application file for complete search history.

(56) References Cited

U.S. PATENT DOCUMENTS

| | | | |
|---|---|---|---|
| 6,210,013 B1 * | 4/2001 | Bousfield | 362/92 |
| 6,231,099 B1 * | 5/2001 | Greenwald | 296/37.8 |
| 6,315,436 B1 | 11/2001 | Schenk et al. | |
| 8,439,418 B1 * | 5/2013 | Lovejoy et al. | 296/37.12 |
| 2002/0159741 A1 * | 10/2002 | Graves et al. | 385/133 |

FOREIGN PATENT DOCUMENTS

GB    928382    6/1963

* cited by examiner

*Primary Examiner* — Lori Lyjak
(74) *Attorney, Agent, or Firm* — Vichit Chea; Price Heneveld LLP

(57) ABSTRACT

A vehicle storage compartment is provided having a housing defining an outer casing and an inner storage space and a shelf disposed within the inner storage space such that the storage space is effectively divided into multiple storage compartments. A light source is operably coupled to the outer casing at an aperture opening into the storage space. The light source is divided by the shelf assembly and positioned to provide light illumination to the multiple storage compartments, as the light source is partially disposed in each of the multiple storage compartments.

19 Claims, 6 Drawing Sheets

LIGHT MODULE FOR UPPER AND LOWER GLOVE BOX BIN

FIELD OF THE INVENTION

The present invention generally relates to vehicle storage compartments, and more particularly, relates to illumination of a vehicle storage compartment, such as a glove box, having multiple storage compartments such as upper and lower storage compartments.

BACKGROUND OF THE INVENTION

Automotive vehicles are commonly equipped with one or more storage compartments for storing items onboard the vehicle. Vehicles typically include a glove box located in the dashboard or panel at the front of the passenger compartment, generally on the front passenger side of the vehicle. The glove box typically includes a storage compartment and a door or lid that opens and closes to allow or prevent access to the compartment. Conventional vehicle glove boxes often employ one or more illumination sources, such as an incandescent bulb or an Light Emitting Diode (LED) light, to provide illumination to the interior of the glove box when the lid is in the open position. More recently, some glove box compartments have been designed to include a shelf which creates a divided compartment storage space or multiple compartment storage space. The presence of a shelf can fully block illumination from a light source to different areas of a divided storage space, or cause for poor light illumination of the storage space due to the shelf preventing light from fully illuminating the divided compartment. Accordingly, it is desirable to provide for enhanced illumination within a vehicle glove box having a shelf such that a single source of illumination is capable of lighting multiple storage compartments.

SUMMARY OF THE INVENTION

According to one aspect of the present invention, a vehicle storage compartment is provided. The vehicle storage compartment includes a housing defining an outer casing and an inner storage space. The storage compartment also has a shelf located within the housing which divides the inner storage space into both upper and lower storage compartments. The storage compartment further includes a light source operably coupled to the outer casing at an aperture opening into the storage space. The light source is positioned to provide light illumination to the upper and lower storage compartments, as the light source is partially disposed in both the upper and lower storage compartments.

According to another aspect of the present invention, a vehicle storage compartment is provided having a housing defining an outer casing and an inner storage space. At least one shelf is disposed within the inner storage space. The shelf divides the storage space into multiple storage compartments. The storage compartment further includes a light source operably coupled to the outer casing of the storage housing at an aperture opening into the inner storage space to provide light illumination to the multiple storage compartments.

According to a further aspect of the present invention, a method of forming a lighted vehicle storage compartment is provided. The method includes providing a housing defining an inner storage space and dividing the inner storage space into an upper storage compartment and a lower storage compartment using a shelf assembly disposed within the inner storage space. The method further includes operably coupling a light source to the housing such that the light source is divided by the shelf assembly. Thus, the light source is partially disposed in both the upper and lower storage compartments to provide light illumination to both the upper and lower storage compartments.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
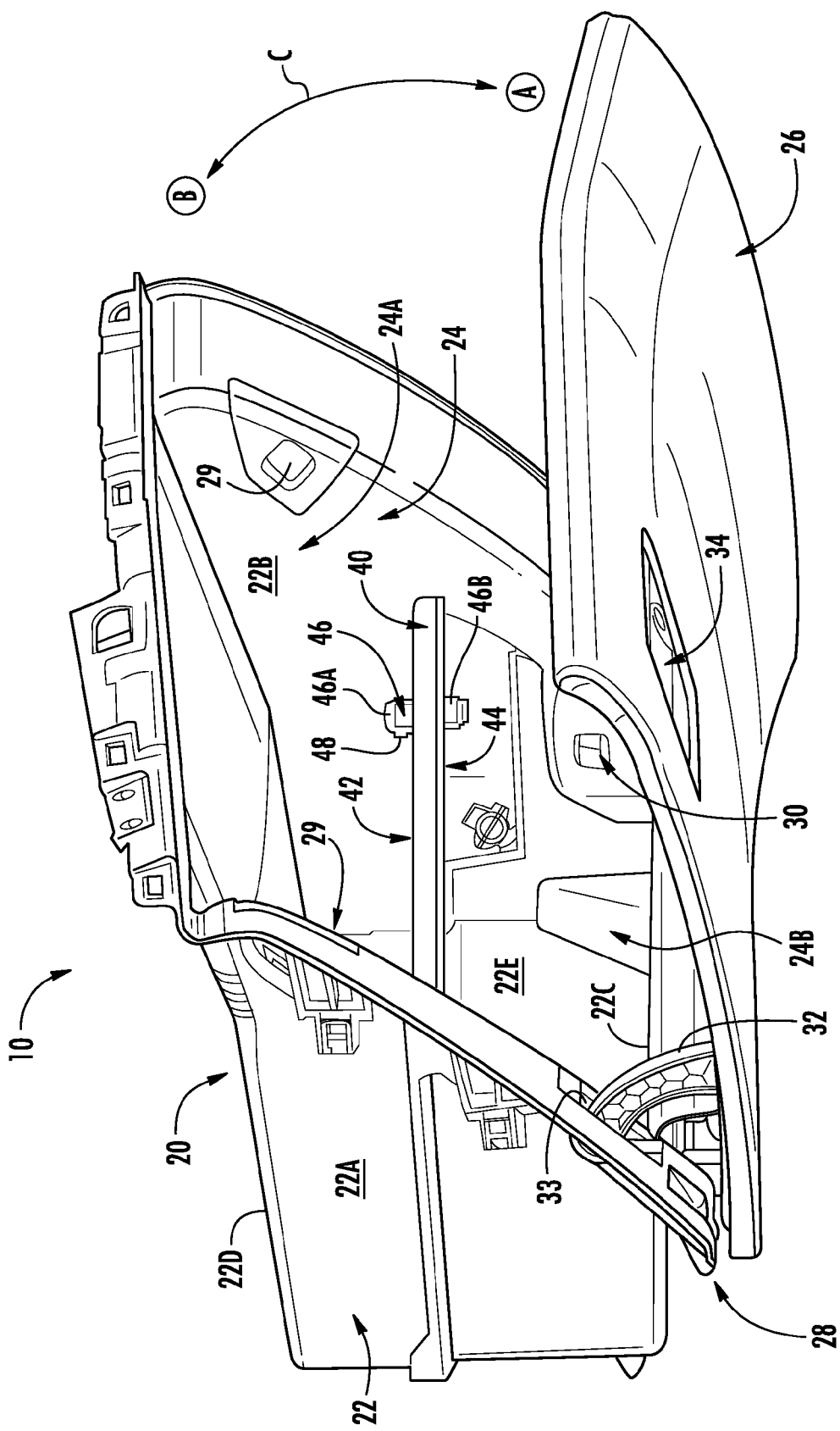
FIG. 1 is a perspective view of an illuminated glove box storage compartment, according to one embodiment.

For purposes of description herein, the terms "upper," "lower," "top," "bottom," "right," "left," "rear," "front," "vertical," "horizontal," and derivatives thereof shall relate to the glove box storage compartment as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the reference numeral 10 generally designates a storage compartment, shown in the form of a glove box in FIG. 1, which is generally integrated into a dash panel or dashboard assembly disposed in a vehicle interior. As commonly found in vehicle interiors, the glove box 10 is generally located forward of a front seated passenger in the vehicle. The vehicle glove box storage compartment 10 includes a housing 20 having an outer casing 22 which defines a storage space 24 of a desired shape and size. The housing 20 is generally defined by walls which may include upstanding lateral side walls 22A and 22B, bottom wall 22C, top wall 22D, and an upstanding rear wall 22E. The shape of the storage compartment 10 may be generally rectangular, according to one embodiment. According to other embodiments, the storage compartment 10 may include an angled top or one or more other angled walls and may have various other shapes and sizes. The glove box storage compartment 10 further includes a front access door or lid 26 that is operable between an open position A (FIG. 1) and a closed position B to allow and prevent access to the inner storage space or compartment 24. The lid 26 is shown pivoting about a horizontal hinge 28 near the bottom of the storage compartment 10, such that the lid 26 moves along an arcuate axis of movement indicated by arrow C. Lid 26 has one or more latch assemblies 30 disposed thereon which align with and engage connecting apertures 29 in the storage compartment housing 20 to secure the lid 26 in the closed position. In the embodiment shown in FIG. 1, the access door or lid 26 is angled to provide a sloping front wall to the storage compartment 10 when in the closed or latched position. Arcuate guides 32 are disposed on lower interior sides of the lid 26 and cooperate with guide apertures 33 disposed on the housing 20 to guide the movement of the lid 26 along the axis of movement C between open and closed positions A, B. As shown in FIG. 1, the storage compartment 10 further includes a latch actuation assembly 34 for releasing the lid 26 as needed. It will be appreciated that other lids and securement mechanisms may be employed to control access to the inner storage compartment 24.

The storage compartment or glove box 10 includes a shelf 40 located within the inner storage compartment 24 such that the overall storage space 24 is divided. In the embodiment shown in FIG. 1, the shelf 40 is shown extending substantially horizontal generally near the middle elevation of the compartment space 24 so as to divide the compartment space 24 into upper and lower storage spaces 24A and 24B, respectively. The shelf 40 may be oriented at other angles, such as a vertical orientation to divide the space into left and right sides, according to other embodiments. In the embodiment shown in FIG. 1, the shelf 40 is substantially planar to generally serve as a shelf or a divider for the inner storage compartment and includes an upper side 42 and lower side 44 that define parameters for the upper and lower storage spaces 24A, 24B. Thus, the shelf 40 divides the interior compartment space 24 into multiple compartments. As shown in FIG. 1, shelf 40 is formed as an integral part with the storage compartment housing 20. Further, it is contemplated that more than one shelf assembly can be used with the present invention to further compartmentalize the inner storage space 24 of the storage compartment 10.

Figure 2:
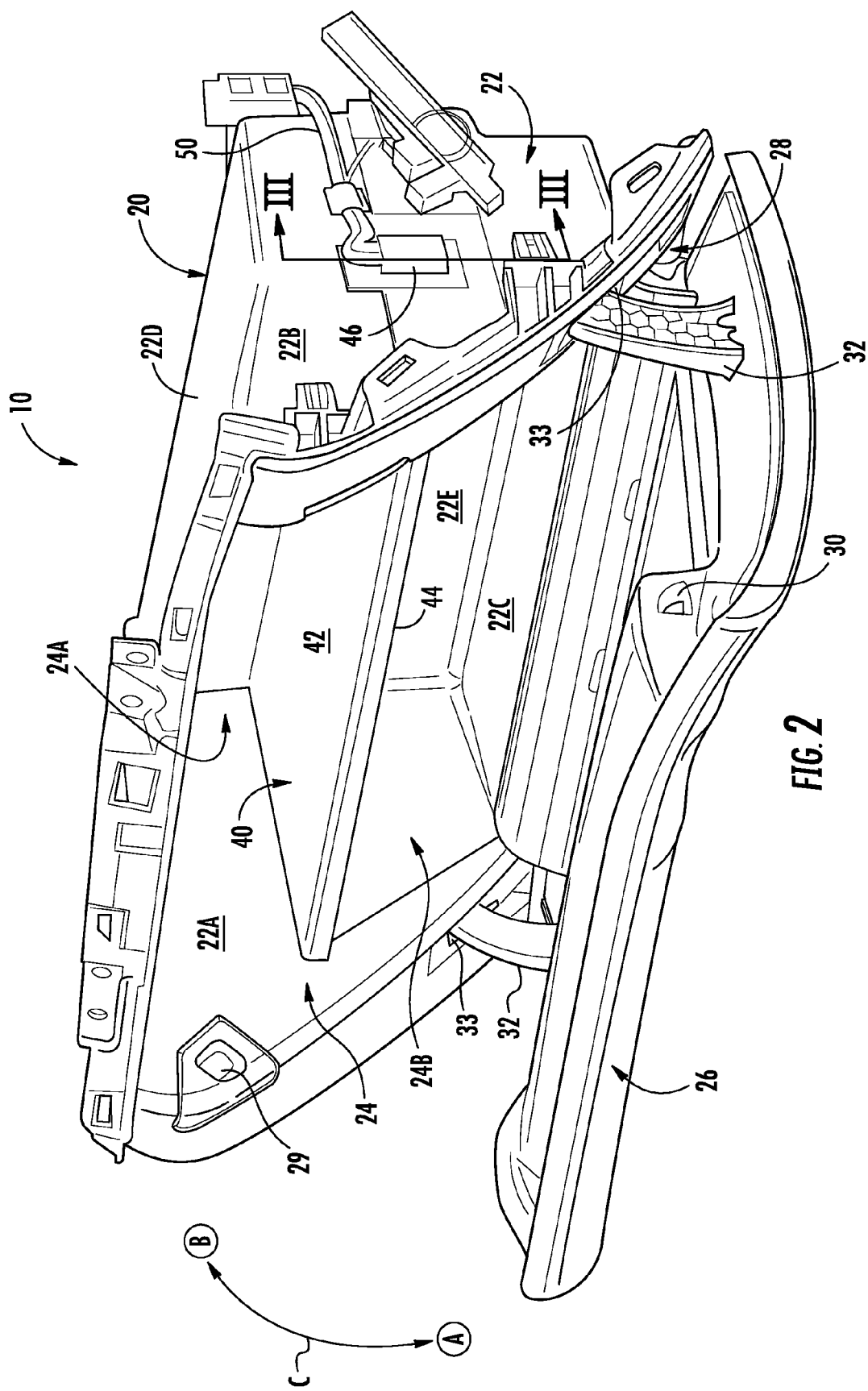
FIG. 2 is another perspective view of the illuminated glove box storage compartment shown in FIG. 1.
Figure 3:
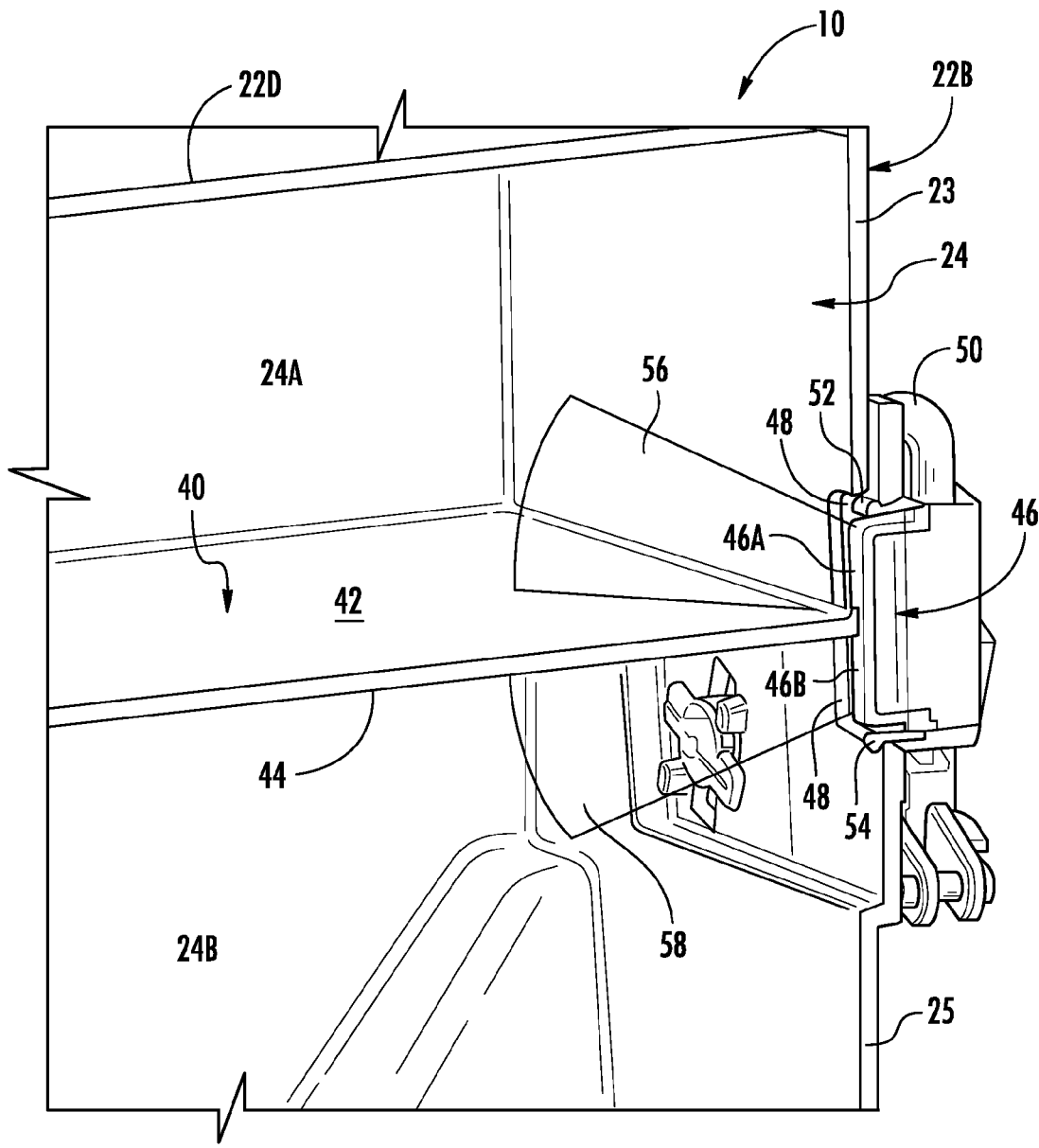
FIG. 3 is a fragmentary cross-sectional view of the illuminated glove box storage compartment taken through line III of FIG. 2.

As shown in FIGS. 1-3, the storage compartment 10 further includes a light source or module 46 operably coupled to the outer casing 22 of the hosing 24 to provide light illumination into the storage space 24. The light source 46 may be a single light emitting diode (LED), according to one embodiment. According to another embodiment, a plurality of LEDs may be employed as the light source 46. Other light sources known in the art may also be employed with the present invention. As shown in FIG. 1, the light source 46 is disposed in an aperture 48 located on lateral side wall 22B and opening into the storage space 24, such that the light source 46 can illuminate the storage space 24. As further shown in FIG. 1, the light source 46 is a generally vertical structure having an overall rectangular shape. The light source 46 is divided by the shelf assembly 40 into upper and lower light source sections 46A and 46B which are partially disposed in the upper and lower storage compartments 24A, 24B, respectively. In this way, the light source 46 can provide illumination for the upper storage space 24A via upper light section 46A, as well as provide illumination for the lower storage space 24B via lower light section 46B. Thus, a single light source is capable of illuminating the entirety of the storage space 24 including upper and lower storage spaces 24A, 24B. As shown in FIG. 1, the light source 46 is divided equally into upper and lower light source sections 46A and 46B by shelf assembly 40.

Referring now to FIG. 2, storage compartment 10 further includes a power source 50 disposed along the outer casing 22 of the housing 24 at lateral wall 22B which provides power to the light source 46. It is contemplated that the power source 50 is connected to an actuator coupled to the housing 20 and in communication with the access door 26, such that the light source 46 will only be powered with the access door or lid 26 is in the open position.

Referring now to FIG. 3, light source 46 is divided by the shelf assembly 40 into upper and lower light source sections 46A and 46B which are partially disposed in the upper and lower storage compartments 24A, 24B, respectively. The light source 46 is coupled to aperture 48 disposed on lateral side wall 22B of the storage compartment 10. Aperture 48 opens into the storage space 24, such that the light source 46 can illuminate the storage space 24. The light source 46 includes clip assemblies, which as shown in FIG. 3 are in the form of upper and lower clip assemblies 52, 54 which operably couple the light source 46 to aperture 48 in a snap-fit engagement. As noted above, the shelf assembly 40 divides the light source 46 into upper and lower light source sections 46A and 46B, such that upper light source section 46A provides for a first light transmitting area 56 adjacent the top side 42 of the shelf assembly 40, and lower light source section 46B provides for a second light transmitting area 58 adjacent the bottom side 44 of the shelf assembly 40.

Figure 4:
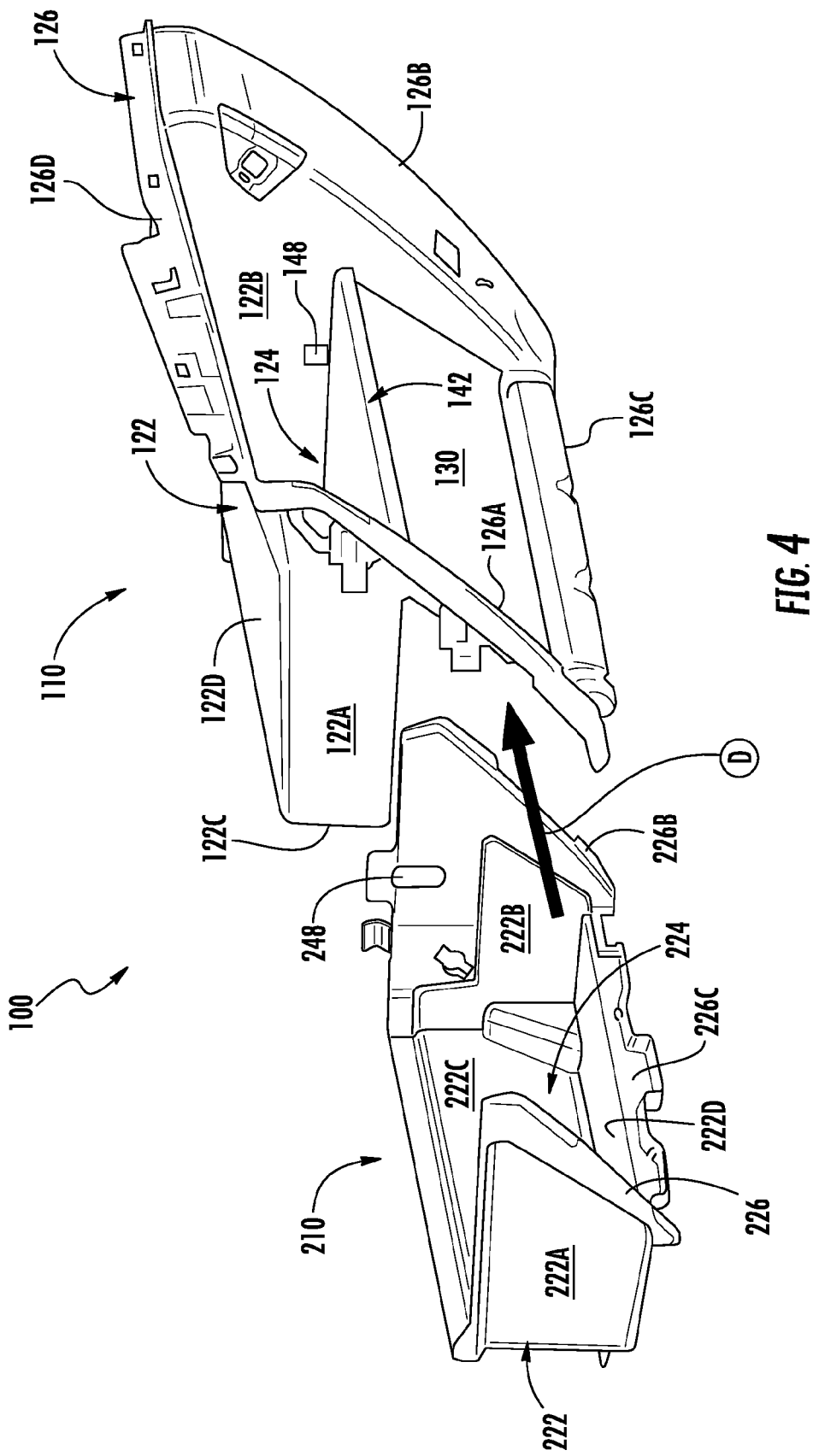
FIG. 4 is an exploded perspective view of a storage compartment, according to another embodiment, having an upper bin member and a lower bin member.
Figure 6:
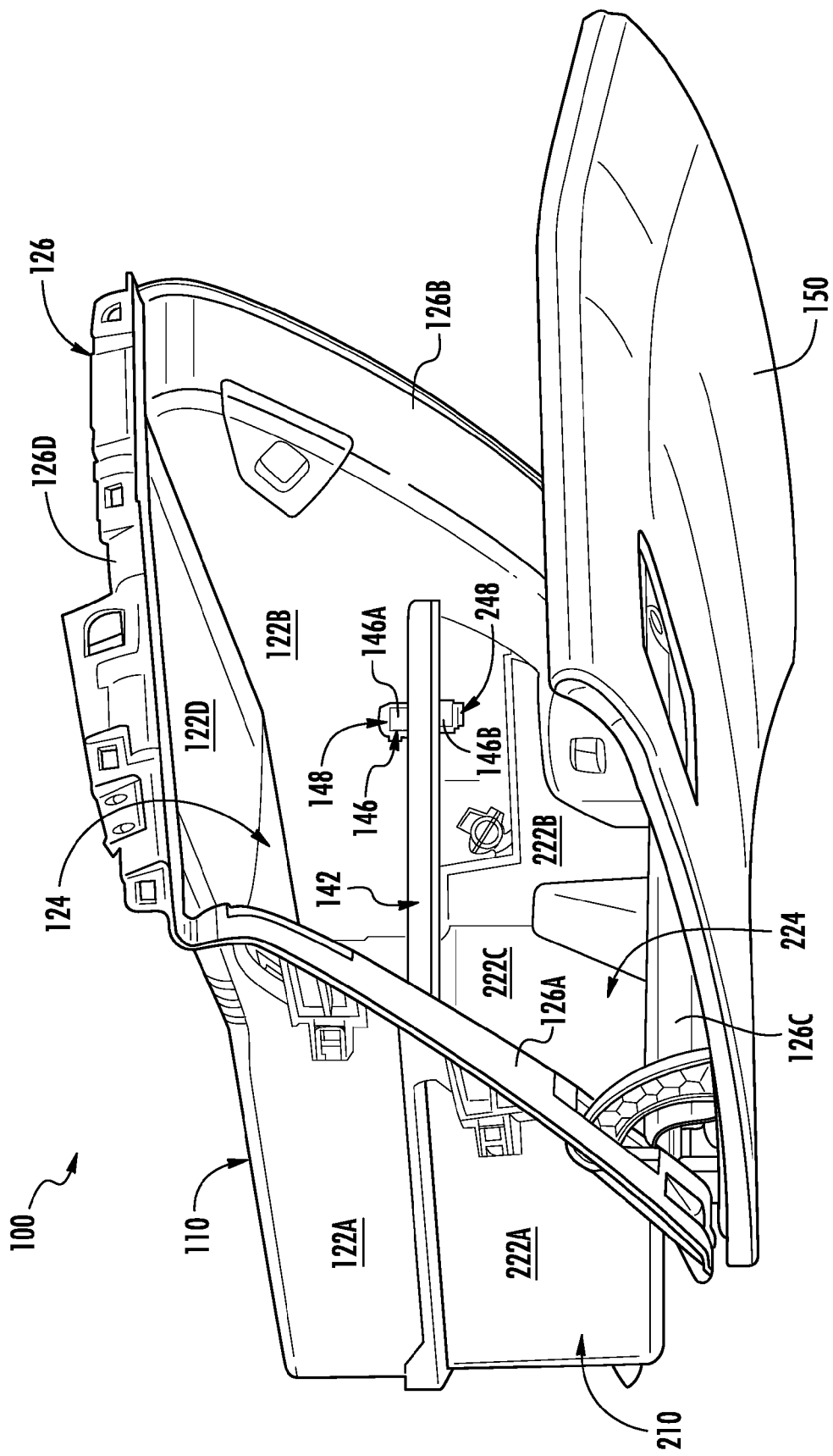
FIG. 6 is perspective view of the upper and lower bin members of FIG. 4 as coupled together to form a storage compartment.

Referring now to another embodiment shown in FIG. 4, a storage compartment 100 is shown having an upper storage bin 110 and a lower storage bin 210 which, in assembly, are coupled together to form storage compartment 100 as shown in FIG. 6. As shown in FIG. 4, the upper storage bin 110 comprises a housing 122 which forms an upper storage compartment 124. The upper storage compartment 124 is defined by generally parallel spaced apart sidewalls 122A, 122B, a top wall 122D, a rear wall 122C, and a bottom wall 142 which serves as a shelf in the assembled storage compartment 100. The upper bin member 110 further comprises a casing 126 having generally parallel sidewalls 126A, 126B, a lower wall 126C, and an upper wall 126D such that the casing 126 generally defines an opening for the storage compartment 100. Between sidewalls 126A and 126B of the casing 126 is an aperture 130 which opens into lower bin member 210 in assembly.

Lower bin member 210 comprises an outer casing 222 having sidewalls 222A, 222B which are spaced apart and generally parallel with a bottom wall 222D and a rear wall 222C disposed there between. The walls of the casing 222 define a lower storage compartment 224 such that in assembly, as shown in FIG. 6, the storage compartment 100 comprises an upper storage compartment 124 and a lower storage compartment 224. The lower bin member 210 comprises front coupling walls 226A, 226B and 226C which are adapted to couple to walls 126A, 126B and 126C of the casing 126 of the upper bin member 110 in assembly.

Figure 5:
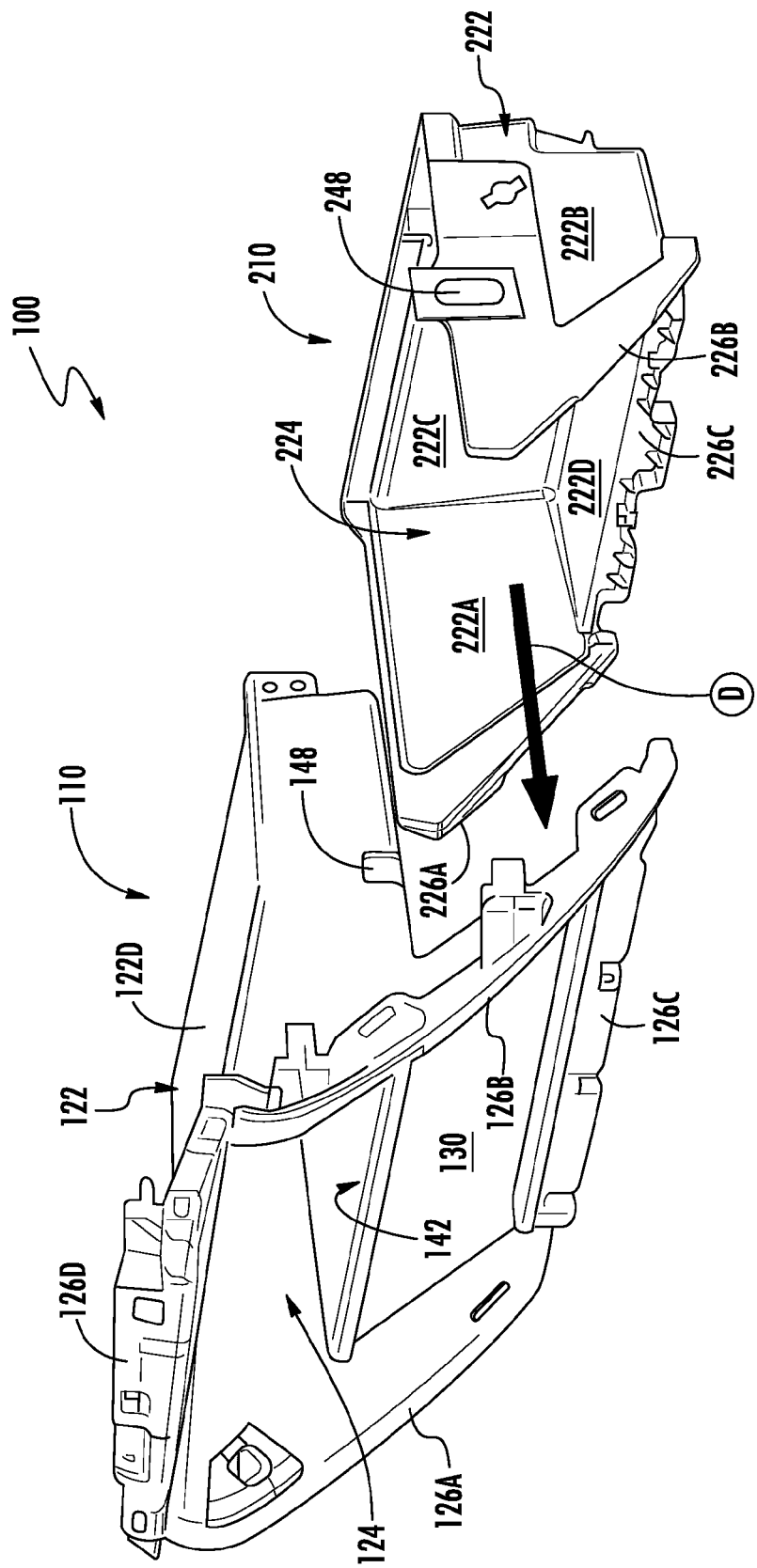
FIG. 5 is an exploded perspective view of the upper and lower bin members of FIG. 4.

As shown as FIGS. 4 and 5, the upper bin member 110 comprises an aperture 148 disposed on sidewall 122B which opens into the upper storage compartment 124. The lower bin member 210 also comprises an aperture 248 on sidewall 222B, such that when upper bin member 110 is coupled to lower bin member 210, shelf 142 of the upper bin 110 divides aperture 248 of the lower bin member 210 as shown in FIG. 6.

Referring now to FIG. 6, the storage compartment 100 comprises upper bin member 110 and lower bin member 210 coupled together to form upper storage compartment 124 and lower storage compartment 224 which are separated by shelf 142. Shelf 142 divides a light source 146 into upper and lower light sources 146A, 146B, such that the single light source 146 is capable of lighting the upper storage compartment 124 through aperture 148 via upper light source 146A, and is also able to illuminate lower storage compartment 224 via light source 146B disposed in aperture 248 of the lower bin member 210. In this way, when a lid or cover 150 is in an open position, as shown in FIG. 6, the light source 146 can be triggered to illuminate both the upper and lower storage compartments 124, 224, such that items stored therein can be illuminated and readily identified using a single light source.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, and those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

It is also to be understood that variations and modifications can be made on the aforementioned structure without departing from the concepts of the present invention.

I claim:

1. A vehicle storage compartment comprising:
    a housing defining an outer casing and an inner storage space;
    a shelf located within the housing dividing the storage space into upper and lower compartments; and
    a light source operably coupled to the outer casing at an aperture opening into the storage space to provide light illumination to the upper and lower compartments, wherein the light source is partially disposed in both the upper and lower compartments.

2. The storage compartment of claim 1, wherein the light source comprises at least one LED.

3. The storage compartment of claim 1, wherein the light source comprises clip assemblies adapted to clip the light source to the outer casing at the aperture opening into the storage space.

4. The storage compartment of claim 1, wherein the shelf divides the light source into a first light transmitting area on a top side of the shelf for illuminating the upper compartment and a second light transmitting area on a bottom side of the shelf for illuminating the lower compartment.

5. The storage compartment of claim 4, wherein the shelf equally divides the light source between the upper compartment and the lower compartment.

6. The storage compartment of claim 1 further comprising an access door movable between an open position and a closed position.

7. The storage compartment of claim 6 further comprising an actuator coupled to the housing and in communication with the access door, wherein the actuator is configured to power the light source only when the access door is in the open position.

8. The storage compartment of claim 1, wherein the storage compartment is a glove box.

9. A vehicle storage compartment comprising:
    a housing defining an outer casing and an inner storage space;
    at least one shelf disposed within the inner storage space dividing the storage space into multiple compartments; and
    a light source operably coupled to the outer casing at an aperture opening into the storage space to provide light illumination to the multiple compartments.

10. The storage compartment of claim 9, wherein the light source comprises at least one LED.

11. The storage compartment of claim 9, wherein the light source comprises clip assemblies adapted to clip the light source to the outer casing at the aperture opening into the storage space.

12. The storage compartment of claim 9, wherein the multiple compartments comprise an upper compartment and a lower compartment.

13. The storage compartment of claim 12, wherein the at least one shelf divides the light source into a first light transmitting area adjacent a top side of the shelf for illuminating the upper compartment and a second light transmitting area adjacent a bottom side of the shelf for illuminating the lower compartment.

14. The storage compartment of claim 9 further comprising an access door movable between an open position and a closed position.

15. The storage compartment of claim 14 further comprising an actuator coupled to the housing and in communication with the access door, wherein the actuator is configured to power the light source when the access door is in the open position.

16. The storage compartment of claim 9, wherein the storage compartment is a glove box.

17. A method of forming an illuminated vehicle storage compartment, said method comprising the steps of:
    providing a housing defining an inner storage space;
    dividing the inner storage space into an upper storage compartment and a lower storage compartment using a shelf assembly disposed therein; and
    operably coupling a light source to the housing such that the light source is divided by the shelf assembly and the light source is partially disposed in both the upper and lower compartments to provide light illumination to the upper and lower storage compartments.

18. The method of claim 17, further comprising providing an access door movable between an open position and a closed position, wherein the access door is coupled to an actuator that is configured to power the light source when the access door is in the open position.

19. The method of claim 17, wherein the step of providing a housing defining a storage compartment comprises providing a housing defining a glove box.

* * * * *